United States Patent [19]

Holen et al.

[11] Patent Number: 4,671,940

[45] Date of Patent: Jun. 9, 1987

[54] AUTOMATIC CENTRIFUGAL BALANCING MECHANISM

[75] Inventors: James T. Holen, Mundelein; Steven G. Schultz, Winthrop Harbor, both of Ill.

[73] Assignee: Abbott Laboratories, North Chicago, Ill.

[21] Appl. No.: 869,161

[22] Filed: May 30, 1986

Related U.S. Application Data

[63] Continuation-in-part of Ser. No. 713,515, Mar. 19, 1985, abandoned.

[51] Int. Cl.[4] .......................... B04B 5/02; G01N 9/30

[52] U.S. Cl. ........................................ 422/72; 494/19; 356/427; 356/428

[58] Field of Search ..................... 422/64, 67, 72, 102; 436/45; 494/16, 19, 20, 26; 210/198.2, 511, 657; 356/426–428

[56] References Cited

U.S. PATENT DOCUMENTS

| | | | |
|---|---|---|---|
| 3,151,073 | 9/1964 | Anthon | 494/20 |
| 3,211,368 | 10/1965 | Shanley | 494/19 |
| 3,679,130 | 7/1972 | Mayo et al. | 494/20 |
| 3,834,613 | 9/1974 | Hankey | 494/16 |
| 4,010,892 | 3/1977 | Revillet et al. | 494/20 |
| 4,322,298 | 3/1982 | Persidsky | 210/787 |
| 4,327,661 | 5/1982 | Boeckel | 494/16 |
| 4,479,720 | 10/1984 | Mochida et al. | 422/72 |
| 4,487,693 | 12/1984 | Ito | 210/657 |

FOREIGN PATENT DOCUMENTS

| | | | |
|---|---|---|---|
| 47751 | 4/1974 | Australia | 422/72 |

*Primary Examiner*—Michael S. Marcus

[57] ABSTRACT

Apparatus for generating centrifugal forces, preferably used in carrying out chemical testing, which includes counterweight means on a rotating plate of the apparatus to automatically balance the rotating plate wherein the counterweight means is displaced in response to centrifugal force and can automatically adjust for the weight, mass or absence of a sample processor card placed in a holding means which is free to rotate independently of plate member.

12 Claims, 6 Drawing Figures

AUTOMATIC CENTRIFUGAL BALANCING MECHANISM

BACKGROUND OF THE INVENTION

Cross Reference to Related Patent Applications

This application is a continuation-in-part of U.S. Ser. No. 713,515 filed, Mar. 19, 1985, now abandoned.

Technical Field

This invention relates to apparatus for chemical testing, and more specifically to an automatic balancing mechanism for use with centrifuge apparatus used in such chemical testing.

Background Art

In copending U.S. patent application Ser. Nos. 606,785; 606,786 and 606,787, filed May 3, 1984, chemical testing apparatus in the form of a centrifuge is disclosed. Such apparatus, as described in such copending applications, the disclosures of which are incorporated herein by reference, is particularly suitable for use in carrying out chemical testing procedures on various biological fluids, such as blood, serum, urine, spinal and amniotic fluids, and the like. As described in those copending applications, the centrifuge apparatus includes a plate member adapted to rotate at high speeds about an axis on which there is mounted one or more holding member(s) capable of receiving a sample processor card which rotates with the plate member. The holding member is adapted to receive a sample processor card; the card defines a series of channels and/or chambers through which liquid undergoing testing can be moved under the influence of centrifugal force.

In the preferred embodiments of the aforementioned centrifuge apparatus, the holding member is itself mounted for rotation relative to the plate member so that the direction of centrifugal force exerted on the sample processor card can be changed to control the flow of liquids therethrough, thereby to effect transfer and ultimate mixing of liquids from one chamber in the processor card to another.

In the inventions described in the aforementioned copending applications, the sample processor card can be provided with a reagent for mixing with, for example, a blood sample, and the mixing is effected by means of centrifugal force. Accordingly, when the disclosed chemical testing apparatus is in operation, the centrifugal force can release the reagent, separate solid particulate matter from the fluid of the blood, measure both the reagent and the blood fluid, mix them together, and finally, transport them to a chamber from which the product of the chemical testing can be measured, for example by optical means, to determine the results of the test. Generally, such results will be an indication of the presence or amount of a particular analyte of interest in the sample.

In the preferred centrifugal apparatus described in the foregoing copending applications, the plate member is usually provided with two or more holding members adapted to receive a sample processor card. When the position and weight of the holding members with sample processor cards mounted thereon is substantially the same, two sample processor cards can be mounted symmetrically relative to the axis of rotation of the plate member to balance the latter during rotation. In one aspect, however, the number of sample processor cards which are physically positioned in the holding members mounted on the rotatable plate member do not distribute the weight symmetrically relative to the axis of rotation, thereby resulting in imbalance of the rotating plate member. In yet another aspect, the weight or mass of the processor cards can vary which also can result in imbalance of the rotating plate member. There is accordingly a need to provide means to automatically balance the plate member so that, whether a sample processor card is present in each holding member or not,or processor cards of varying weight or mass are present in the holding members a substantially uniform balance in the rotatable plate member is nonetheless achieved.

SUMMARY OF THE INVENTION

The concepts of the present invention reside in apparatus for generating centrifugal forces, and preferably include a plate member adapted to rotate at high speeds about an axis on which there is mounted, radially of the axis, a holding means. The holding means is mounted on the plate member for rotation therewith, and, can be rotated independently of the rotation of the plate member. When the holding means are more than one in number, they are preferably positioned symmetrically in relation to the axis of rotation of the plate member.

As described in the foregoing copending applications, the holding means is adapted to receive an article to be subjected to centrifugal force. The article is, preferably, a sample processor card which defines a series of channels and/or chambers through which liquid undergoing testing can be moved under the influence of centrifugal force.

The automatic balancing mechanism of the present invention, which upon such centrifugal apparatus as aforedescribed, comprises a counterweight means positioned on the plate member between the holding means and the axis of rotation of the plate member. Also positioned on the plate member is a trigger means adjacent to the holding means and adapted to engage the article to be subjected to centrifugal force upon placement of the article in the holding means but disengage from the article when centrifuged whereby the holding means and article is free to rotate while the counterweight means is held in a balancing position by the trigger means. Thus, when such an article is positioned in the holding means, the trigger means engages the counterweight means and prevents displacement by centrifugal force of the counterweight means without restricting the movement of the article and holding means. On the other hand, when no such article is positioend in the holding means, the trigger means does not engage the counterweight means, and thus centrifugal force, when the plate member is rotated about its axis, displaces the counterweight means toward the holding means, thereby to counterbalance the holding means not containing the article. In one embodiment the trigger means has a plurality of spaced counterweight engagement surfaces which can displace the counterweight at varying distances while being centrifuged. This feature provides a variable auto-balance when employing articles of varying mass or weight in the holding means.

It has been found, in accordance with preferred embodiments of the invention, that a sample processor card positioned in the holding means can be counterbalanced by the counterweight means when no corresponding sample processor card is positioned in any other holding means on the plate member. Further when the trigger means has a plurality of counterweight engagement surfaces, the sample processor cards of different mass or weight can be positioned in the holding means without disrupting the balance of the centrifuge. Because this automatic balancing feature is virtually self-activating without the need for a separate actuation, apart from positioning or not positioning a sample processor card in the holding means, the user of the centrifugal apparatus is assured that it will be balanced even when it is used with an odd number of sample processor cards or sample processor cards of varying weight and mass.

It is accordingly an object of the present invention to provide an automatically-acting balance mechanism for balancing centrifuges of the type aforedescribed which does not interfere with the independent movement of the sample processor card and holding means with respect to the plate's rotation.

It is a more specific object of the invention to provide such an automatic balancing mechanism for centrifuges in which that mechanism automatically balances the rotating plate member of the centrifuge when no sample processor card is present in a given holding member and/or the sample processor cards are of a differnet mass or weight.

These and other objects and attendant advantages of the invention will appear more fully hereinafter from the detailed description which follows. For purposes of illustration, but not of limitation, preferred embodiments of the invention are shown and described with reference to the accompanying drawings.

DETAILED DESCRIPTION OF THE INVENTION

Figure 1:
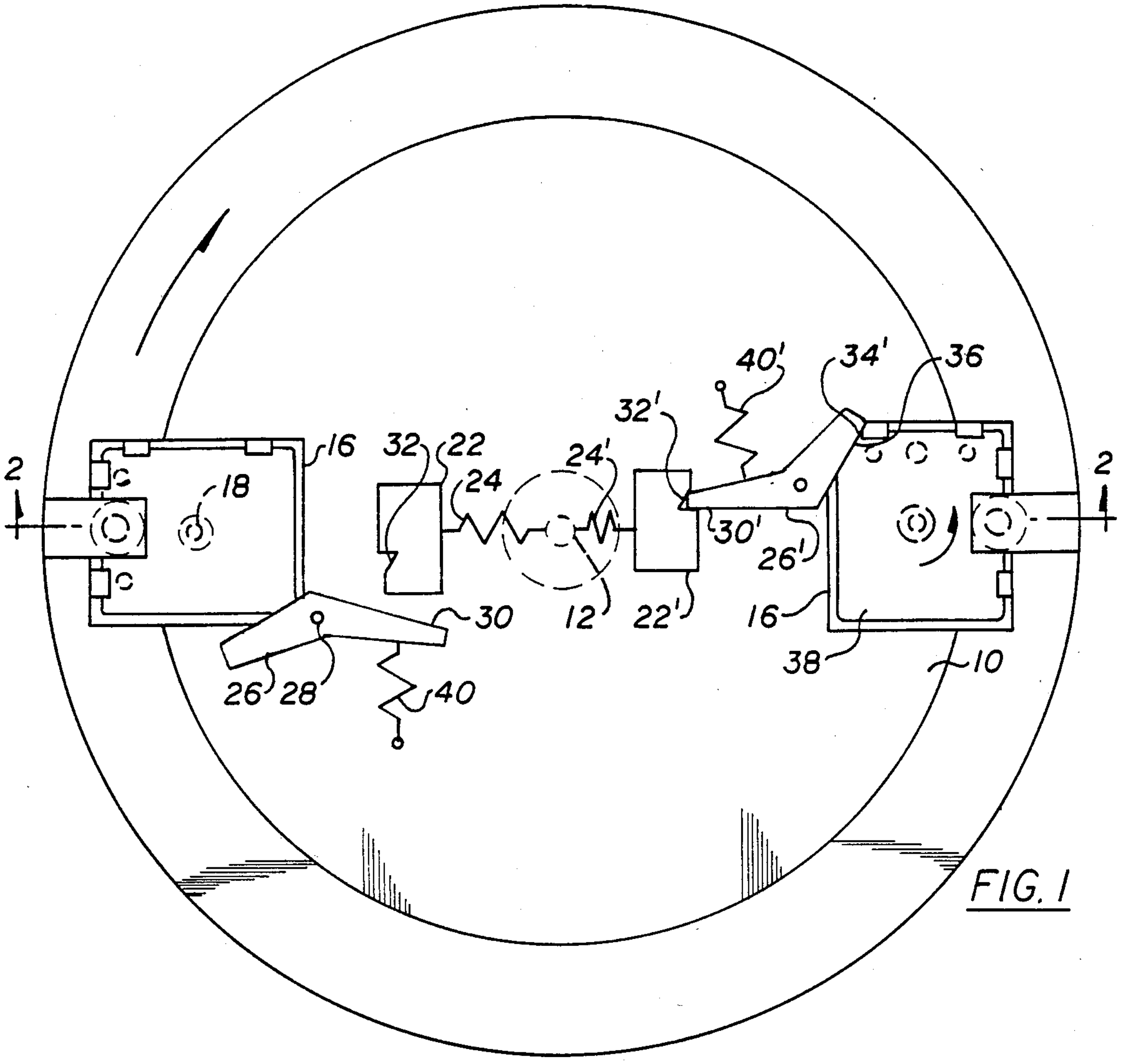
FIG. 1 is a top view in elevation of a schematic diagram of centrifugal apparatus embodying the automatic balancing concepts of the present invention.
Figure 2:
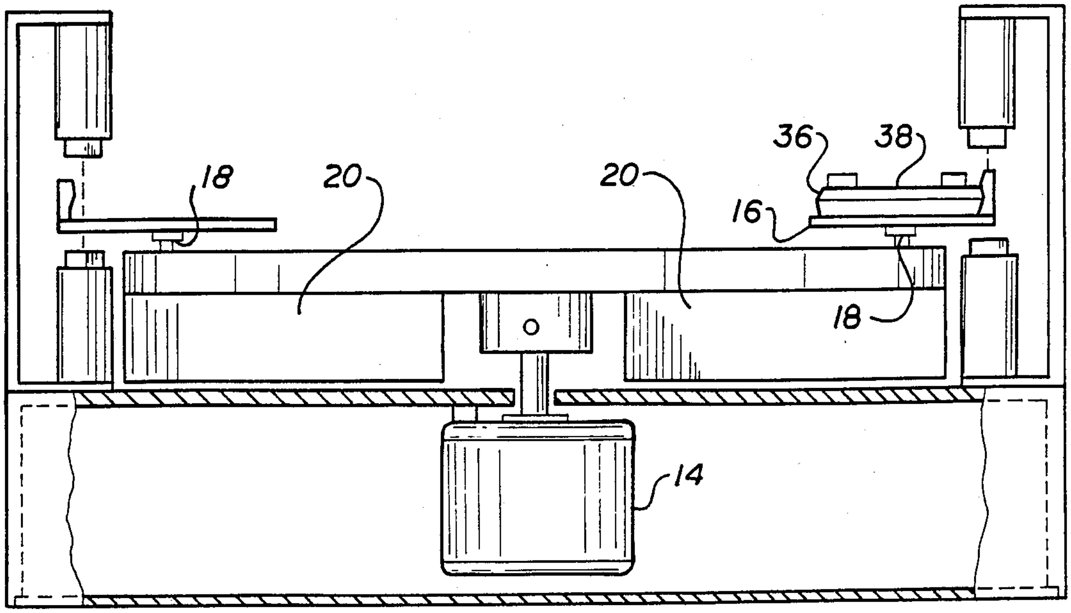
FIG. 2 is a side-elevational view in cross-section, and partially broken away to show details of construction, of the apparatus shown in FIG. 1, taken generally along the line 2—2 thereof.

Referring now in more detail to the drawings, FIGS. 1 and 2 illustrate one aspect of the centrifugal apparatus embodying the concepts of the invention. The centrifuge generally shown includes a plate member 10 which is mounted for rotation about an axis 12. The plate member 10 is preferably driven by a suitable drive means 14, which may be, for example, an electric motor operating at high speeds. While plate member 10 is illustrated in FIG. 1 as a circular plate, it will be understood that its configuration is not critical to the practice of the invention. For example, it is equally possible to employ a centrifugal arm mounted for rotation about an axis.

Mounted on plate member 10 is at least one sample processor card holding means 16 (although in the preferred embodiment shown, two holding means 16 are illustrated). The holding means 16 is adapted to receive a sample processor card, as described more fully in the foregoing copending applications. As is described in such copending applications, the card holder 16 is preferably in the nature of a tray and is rotatably mounted relative to the plate member 10 on an axis 18, specifically connected to means 20 (FIG. 2) to rotate the card holder 16. Since the particular means 20 to rotate the holding means 16 forms no part of the present invention, the details thereof have been omitted from the drawings for the sake of simplicity.

While the axis of rotation 12 of the plate member 10 is illustrated in FIG. 2 as being vertical, it will be understood by those skilled in the art that the orientation of the axis 12 is not critical to the practice of the invention. Accordingly, the axis of rotation of the plate member 10, while preferably vertical, can also be horizontal, or inclined in any direction, since the effects of gravity on the sample processor card rotating with the plate member 10 are negligible.

In the preferred practice of the invention, the card holder 16 can be rotated or indexed relative to the plate member 10 by the means 20. In an especially preferred embodiment, the holding means 16 can be rotated or indexed substantially 90° relative to the plate member 10. However, as will be appreciated by those skilled in the art, the holding means 16 can be rotatable by an amount greater than 90°, up to and including a full 360°. An important feature is that the card holder 16 be adapted to receive the sample processor card which is rotated relative to the plate member 10 so that the direction of the centrifugal force acting on the sample processor card can be altered to effect the necessary fluid-transport functions during the chemical testing operation. More importantly to the subject invention is that the automatic balancing mechanism does not interfer with the ability of the holding device and thereby the sample processor card to rotate relative to the plate member 10.

For ease of description, shown in FIGS. 1 and 2 are a pair of holding means 16 mounted symmetrically with respect to the axis of rotation 12 of the plate member 10. As will be appreciated by those skilled in the art, it is equally possible, and somtimes preferred, to equip the plate member 10 with only one or a greater number than two, of holding means 16 which can be, and preferably are, symmetrically spaced about the plate member 10.

The automatic balancing device of the present invention includes a pair of counterweights 22 and 22' which are capable of displacement along a radius of the axis of rotation 12 of the plate member 10 toward and away from the holding means 16. Each of the counterweights 22 and 22' is spring-biased by means of spring means 24 and 24', whereby the counterweight can be maintained in a stored position, illustrated by reference to the counterweight 22' in FIG. 1.

Positioned adjacent to the holding means 16 is a trigger means 26, pivotally mounted about a pivot point 28. The trigger means 26 has at least one portion or surface 30 adapted to engage a corresponding engagement means 32 of the counterweight 22. The trigger means includes a cam surface 34 which is adapted to engage a lateral surface 36 of a sample processor card 38, when the latter is positioned in the holding means 16.

Considering the right-hand holding means 16 in FIG. 1, a sample processor card 38, placed in the holding means 16, serves to pivot the trigger means 26' against the effect of a spring 40', so that the engaging portion or surface 30' of the trigger means 26' engages the corresponding engaging means 32' of the counterweight 22'. Thus, as the plate member 10 is rotated, the counterweight 22' is prevented, by the engagement of the trigger means 26' with the counterweight 22', from being displaced toward the holding means 16.

When no sample processor card is positioned in the holding means 16, as shown in the left-hand side of FIG. 1, the trigger means 26 is biased by means of spring 40 away from engagement with the counterweight means 22. Thus, as the plate member 10 is rotated, the counterweight 22 is displaced against the action of the spring 24 toward the left-hand holding means 16 shown in FIG. 1. The displacement of the counterweight 22 away from the axis of rotation 12 of the plate member 10, as is appreciated by those skilled in the art, serves to counterbalance absence of the weight of the sample processor card 38 in the left-hand holding means 16.

Thus, a sample processor card 38, by means of the trigger means 26', causes the counterweight 22' to remain in the stored position because of its presence, while the absence of a sample processor card in the left-hand holding means 16 allows the counterweight 22 to be displaced away from the axis of rotation 12 of the plate member 10 to a balancing position, thereby to offset and counterbalance the absence of the sample processor card in the left-hand holding means 16 of FIG. 1.

It will be well understood by those skilled in the art that other configurations and arrangements of the counterweight with respect to the sample processor card holding means are possible. For example, it is possible to employ one counterbalance system for each of a plurality of pairs of sample processor card holding means 16 upon the plate member 10. In that way, a sample processor card would always be provided to the holding means 16 not equipped with the automatic balancing device, while the opposite holding means 16 would be provided with an automatic balancing mechanism to counterbalance the sample processor card when no sample processor card is used in such opposite holding means 16.

Figure 3:
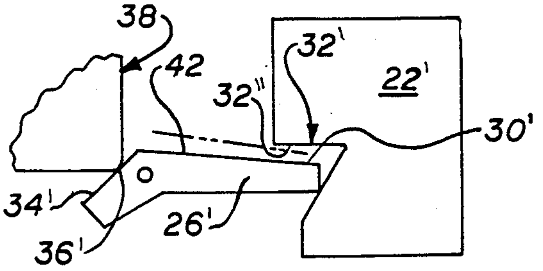
FIG. 3 is a partially schematic view of a portion of one embodiment of the apparatus shown in FIG. 1, and showing a portion of the centrifugal apparatus in an initial operational (rotational) condition.
Figure 4:
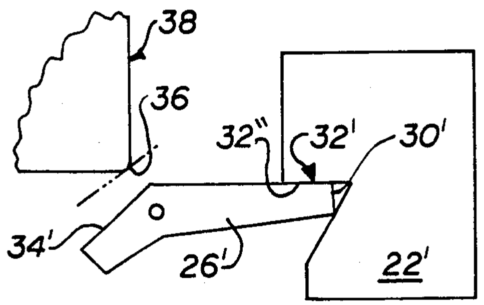
FIG. 4 is a view similar to FIG. 3 but showing the portion of the apparatus in a fully rotational operational condition.

Referring now to FIGS. 3 and 4 of the drawings for a further explanation of the operation of a centrifuge incorporating the concepts of the present invention, in a preferred embodiment thereof, an enlarged view of the counterweight 22', trigger means 26' and sample processor card 38 of FIGS. 1 and 2 is shown. In operation of the centrifuge and concommitant rotation of the plate member 10, as previously described, initial engagement of the trigger means 26' with the counterweight 22' is shown in FIG. 3. In such initial engagement, a gap 42 exists between an upper edge 32" of the engagement means 32' of the counterweight 22'; and portion 30' of the trigger means 26'; the gap 42 is present at the beginning of rotation of the plate member 10 when the centrifuge is initially placed in operation, as is the case when, for example, assays or chemical tests are being performed using the centrifuge. At this point in operation, the trigger means 26' is in contact with the card 38 along its cam surface 34'. However, as shown in FIG. 4, as the plate member 10 rotationally accelerates, the weight of the counterweight 22' bearing against the trigger means 26' further rotates the latter so that the gap 42 closes and the portion 30' of the trigger means 26' contacts the upper edge 32" of the engagement means 32'. The trigger means 26' therefore is no longer in contact along its cam surface 34' with the card 38. Thus, the card 38 can rotate freely relative to the plate member 10 without being hindered by the action of trigger means 26'.

Figure 5:
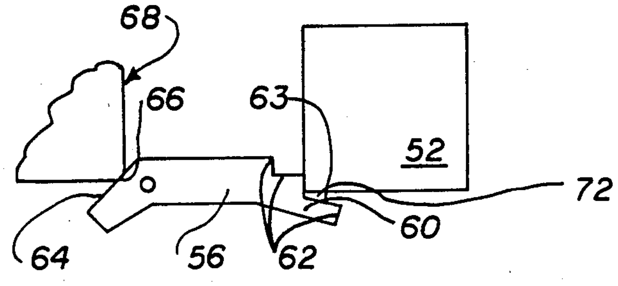
FIG. 5 is a partially schematic view of another embodiment of the apparatus having variable auto-balance positions, and showing a portion of the centrifugal appartus in an initial operational (rotational) condition.
Figure 6:
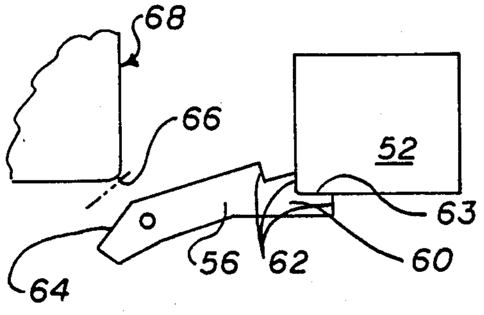
FIG. 6 is a view similar to FIG. 5 but showing the portion of the apparatus in a fully operational condition.

FIGS. 5 and 6 demonstrate yet another embodiment of the subject automatic balancing mechanism where the trigger means 56 has a plurality of engagement surfaces 62 to contact the counterweight 52.The plurality of engagement surfaces 62 allow the placement of varying mass or weight of sample processor cards 68. For example when a sample processor card 68 is placed in the holding means a surface of the sample processor card 66 which is designed relative to the mass or weight of the card 68, will engage the trigger means 56 along its cam surface 64. Thus the portion 60 of the trigger means 56 will be displaced proportional to the mass or weight of the card 68. An engagement surface 62 will engage the counterweight 52 proportional to the amount of diplacement caused by the engagement of the card 68 at surface 66 with the cam surface 64 of the trigger means 56. This in turn will cause the counterweight 52 to be held and displaced in a position appropriate to balance the centrifuge for a given sample proccessor card 68.

In operation of the centrifuge and concommitant rotation of the plate member 10, as previously described, initial engagement of the trigger means 56 with the counterweight 52 is shown in FIG. 5. In such initial engagement, a gap 72 exists between an upper edge 63 of the trigger means 56 and the counterweight 52;the gap 72 is present at the beginning of rotation of the plate member 10 when the centrifuge is initially placed in operation, as is the case when, for example, assays or chemical tests are being performed using the centrifuge. At this point in operation, the trigger means 56 is in contact with the card 68 along its cam surface 64. However, as shown in FIG. 6, as the plate member 10 rotationally accelerates, the weight of the counterweight 52 bearing against the trigger means 56 further rotates the latter so that the gap 72 closes and the portion 63 of the trigger means 56 contacts an edge of the counterweight 52. The trigger means 56 therefore is no longer in contact along its cam surface 64 with the card 68. Thus, the card 68 can rotate freely relative to the plate member 10 without being hindered by the action of trigger means 56. However, the counterweight 52 remains appropriately displaced to balance the centrifuge.

It will be understood that various changes and modifications can be made in the specific details of construction, procedure and use of the invention as described herein, without departing from the spirit and scope of the invention, which is defined solely in the following claims.

What is claimed is:

1. An apparatus for generating centrifugal forces including a plate member adapted to rotate about an axis and holding means mounted on said plate member in rotation therewith, said holding means being positioned on the plate member radially of the axis of rotation of the plate member and being adapted to independently rotate relative to said plate member and said holding means being adapted to receive an article to be subjected to centrifugal force, the improvement comprising:

(a) at least one counterweight means positioned on said plate member between said holding means and the axis of rotation of the plate member, said counterweight means having means to releasably engage a trigger means, and (b) trigger means positioned adjacent to said holding means and adapted to engage an article to be subjected to centrifugal force when such article is positioned in said holding means, thereby to engage the counterweight means and prevent displacement by centrifugal force of the counterweight means and allow said holding means to rotate independent of the rotation of said plate member; and to allow the counterweight means to be displaced toward said holding means when no article is positioned therein, whereby said holding means is balanced.

2. The apparatus as defined in claim 1, further including means for rotating the plate member about the axis.

3. The apparatus as defined in claim 1, further including means to rotate said holding means relative to the plate member.

4. The apparatus as defined in claim 1, wherein the trigger means is capable of being pivoted in response to the placing of the article in said holding means so that the trigger means engages said counterweight means to maintains said counterweight means in a storage position.

5. The apparatus as defined in claim 1, wherein the trigger means is biased away from engagement with said counterweight means so that the trigger means is maintained away from engagement with said counterweight means when no article is positioned in said holding means.

6. The apparatus as defined in claim 1, wherein said counterweight means is biased toward the axis of rotation of the plate member.

7. The apparatus as defined in claim 1, wherein said trigger means comprises a plurality of engagement surfaces to engage said counterweight means and prevent displacement by centrifugal force of the counterweight means.

8. The apparatus as defined in claim 7, wherein said trigger means is adapted to automatically adjust the position of the counterweight means to properly balance a plurality of different sample processor means with respect to mass or weight.

9. An apparatus for carrying out chemical testing under centrifugal force, including a plate member adapted to rotate about an axis and a holding means mounted on the plate member for rotation therewith, said holding means being positioned on the plate member radially of the axis of rotation of the plate member and being adapted to independently rotate relative to said plate member and being adapted to receive sample processor means for carrying out chemical testing under the influence of centrifugal force, the improvement comprising:

(a) at least one counterweight means positioned on the plate member between said holding means and the axis of rotation of the plate member, the counterweight means having means to releasably engage a trigger means, and (b) trigger means positioned adjacent to said holding means and adapted to engage the sample processor means to be subjected to centrifugal force when such sample processor means is positioned in said holding means, thereby to engage the counterweight means and prevent displacement by centrifugal force of the counterweight means and allow said holding means to rotate independent of the rotation of said plate member; and to allow the counterweight means to be displaced toward said holding means when no sample processor means is positioned in said holding means, thereby to counterbalance said holding means.

10. The apparatus as defined in claim 9 which includes means for rotating the plate member about the axis.

11. The apparatus as defined in claim 9, wherein said trigger means comprises a plurality of engagement surfaces to engage said counterweight means and prevent displacement by centrifugal force of the counterweight means.

12. The apparatus as defined in claim 11, wherein said trigger means is adapted to automatically adjust the position of the counterweight means to properly balance a plurality of different sample processor means with respect to mass or weight.

* * * * *